Dec. 16, 1941.   J. E. HAINES   2,266,029
ZONE AIR CONDITIONING SYSTEM
Filed Nov. 11, 1935   3 Sheets-Sheet 1

Inventor
John E. Haines
By George H Fisher
Attorney

Dec. 16, 1941.   J. E. HAINES   2,266,029
ZONE AIR CONDITIONING SYSTEM
Filed Nov. 11, 1935   3 Sheets-Sheet 3

Fig. 3

Inventor
John E. Haines
By George H. Fisher
Attorney

Patented Dec. 16, 1941

2,266,029

UNITED STATES PATENT OFFICE 2,266,029

ZONE AIR CONDITIONING SYSTEM

John E. Haines, Minneapolis, Minn., assignor to Minneapolis-Honeywell Regulator Company, Minneapolis, Minn., a corporation of Delaware Application November 11, 1935, Serial No. 49,161

12 Claims. (Cl. 257—3)

The present invention relates to an air conditioning system of general utility but deals particularly with a system in which the conditions of the air in a plurality of spaces are individually controlled.

One of the objects of the present invention is the provision of an air conditioning system in which conditioned air is supplied to a plurality of spaces to be controlled, and in which the effect of this conditioned air on each space is controlled by condition responsive means responsive to the condition of each space. Preferably, the arrangement is such that the means responsive to the conditions in all of the spaces cooperate with each other in a manner to maintain the conditions in all of the spaces equal or in a predetermined relation to each other by varying the amounts of conditioned air delivered to all of the spaces.

Another object of the invention is the provision of air conditioning systems of the types set forth above in which the conditioned air supplied to the various spaces is controlled by air condition responsive means which respond to the conditions in all of the spaces, as by being subjected to a mixture of air withdrawn from all of the spaces. Looking at this phase of the invention in another manner, a supply of conditioned air is controlled by the combined conditions in a plurality of spaces to be controlled and this conditioned air is then supplied to the various spaces and is additionally controlled by the conditions in each space.

A further object of the invention is the provision of means to vary the standard of the mixture of air withdrawn from all of a plurality of spaces in accordance with fluctuations in an outdoor condition and individually controlling the conditions in each of the spaces.

Another object of the invention is the provision of a cooling and dehumidifying system for air in which moisture responsive means controls the cooling of the air when the moisture content is too high and in which temperature responsive means either then heats this air or additionally controls the cooling thereof depending upon whether heating or cooling is then required.

A further object of the invention is the provision of a system for utilizing the heat generated by a refrigeration system for heating air. This phase of the invention has particular utility where the refrigeration apparatus cools the air under the control of a moisture responsive means, the heat generated by the refrigerating apparatus then being used to reheat the air under the control of a thermostat if such reheating be necessary or desirable.

Still another object of the invention is the provision of a heating and cooling system in which cooled air is supplied to a plurality of spaces under the control of damper means controlled by the temperatures of the spaces, together with means to cause the damper means to take predetermined positions during the heating cycle and controlling the ultimate temperature of each space during the heating cycle by a control arrangement which does not operate the cooling cycle damper means.

Another object of the invention is the provision of a heating system in which heated air is supplied from a main heating device to each of a plurality of spaces, each space being additionally heated, as required, by an auxiliary heating means controlled by the temperature of the particular space which it heats. In the specific embodiment to be hereinafter described, the main heating device is controlled both by the outdoor temperature and the temperature of the air delivered from the main heating device so as to maintain this delivered air temperature substantially constant or above a predetermined minimum. The air is then split-up and delivered to the various spaces and individual auxiliary heaters are utilized to furnish additional heat to the air delivered to each space under the control of the temperature of such space.

Other objects of the invention include the combination of the various sub-systems set forth above in manners to provide complete air conditioning systems for heating, cooling and dehumidifying and also include the detailed arrangements found in the various sub-systems, and these objects of the invention, as well as others, will be found in the detailed description, the drawings and the claims.

For a more complete understanding of this particular embodiment of the invention, reference may be had to the following detailed description and the accompanying drawings, in which:

Fig. 3 is a detailed schematic showing of the manner in which the main supply of conditioned air is cooled or reheated.

Figure 1:
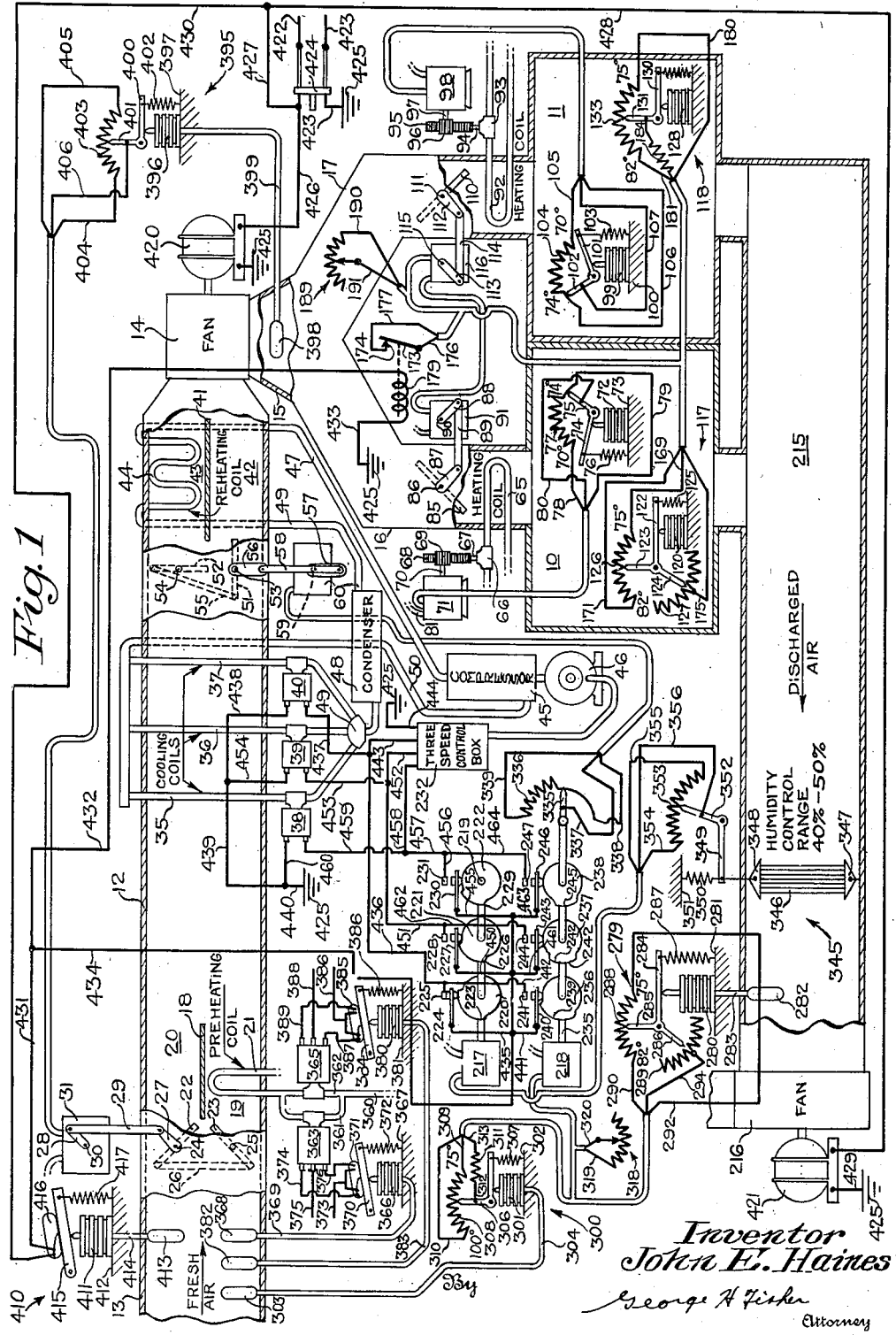
Fig. 1 is a schematic showing of the complete system.

Referring first to Fig. 1 of the drawings, two rooms or spaces which it is desired to heat and cool, according to requirements, are indicated at 10 and 11. For the purpose of heating and cooling the rooms 10 and 11, an air conditioning device 12 is provided. This device is provided with an inlet duct 13 for the supplying of air thereto and in this embodiment of the invention, this inlet duct 13 is in communication with the outside atmosphere so that fresh air is supplied to the air conditioning device 12. The air conditioning device 12 is further provided with a fan 14 for causing the circulation of air therethrough whereupon the air is discharged into a delivery duct 15 that is provided with two branches 16 and 17 which respectively communicate with the rooms 10 and 11. Near the inlet end of the air conditioning device 12, the same is provided with a transverse partition 18 which provides a preheating chamber 19 and a by-pass chamber 20. Located within the preheating chamber 19 is a preheating coil 21 which is supplied with a heating medium in a manner to be described hereinafter. The proportions of the fresh air which flow through the preheating chamber 19 and over the preheating coil 21 and which flow through the by-pass chamber 20 are determined by a pair of dampers 22 and 23 which are respectively secured to pivoted shafts 24 and 25. These two dampers 22 and 23 are interconnected by a link 26 in such a manner that the damper 23 moves towards open position as the damper 22 moves towards closed position and vice versa. A crank 27 is secured to the shaft 24 and is connected to a similar crank 28 by means of a link 29. The crank 28 is secured to the main operating shaft 30 of a motor mechanism 31 which is controlled in a manner to be described hereinafter.

The air conditioning device 12 is further provided with a plurality of cooling coils 35, 36 and 37, the flow of cooling fluid through which is respectively controlled by means of electrically operable valves 38, 39 and 40. Also located in the air conditioning device 12, is a second transverse partition 41 which divides the same into a by-pass chamber 42 and a reheating chamber 43. Located within the reheating chamber 43 is a reheating coil 44. The reheating coil 44 forms a part of a mechanical refrigeration system that includes a compressor 45 which is driven by a compressor motor 46. The hot gaseous refrigerant which is delivered from the compressor 45 first flows through the reheating coil 44, the compressor being connected thereto by means of a pipe 47. The discharge end of the reheating coil 44 is connected to a condenser 48 by means of a pipe 49. The condenser 48 is in turn connected to the electrically operable valves 38, 39 and 40 through a distributing head 49. A return pipe 50 connects the discharge end of all of the cooling coils 35, 36 and 37 with the compressor 45. From the foregoing, it will be apparent that the hot gaseous refrigerant is first delivered to the reheating coil 44 and thereby acts to add heat to any air which may be passing thereover. This somewhat reduces the temperature of the gaseous refrigerant and it then passes to the condenser 48 which causes a further reduction in the temperature thereof sufficient to liquefy the refrigerant in the usual manner after which it passes to the cooling coils 35, 36 and 37 under the control of their respective electrically operable valves 38, 39 and 40.

The proportions of air passing through the by-pass chamber 42 and the reheating chamber 43 are determined by a pair of dampers 51 and 52 which are respectively secured to pivoted shafts 53 and 54. These dampers 51 and 52 are interconnected by means of a link 55 in such a manner that the damper 52 moves towards closed position as the damper 51 moves towards open position and vice versa. A crank 56 is secured to the shaft 53 and in turn is connected to a similar crank 57 by means of a link 58. The link 57 is in turn secured to the main operating shaft 59 of a motor mechanism 60 which is controlled in a manner to be described hereinafter.

The branch duct 16 is provided with a heating coil 65 which may be supplied with any suitable heating medium and the flow of heating medium thereto is controlled by a valve 66. The valve 66 is provided with a valve stem 67 to which a rack 68 is connected. Cooperating with this rack 68 is a pinion 69 which is secured to the main operating shaft 70 of a motor mechanism 71. This motor mechanism 71 is controlled by a thermostat responsive to the temperature of the room or space 10. This thermostat includes a pressure responsive member 72 which has one of its ends secured to or mounted upon a suitable support 73. The pressure responsive member 72 herein takes the form of a bellows and is charged with a suitable volatile fluid, as is well-known in the art, whereby varying pressures are developed in the bellows 72 upon temperature changes. The free end of bellows 72 operates a bell-crank that includes an actuating arm 74 and a control arm 75. A spring 76 has one of its ends secured to the actuating arm 74 and its other end to the support 73 and acts to oppose the variable pressures built up in the bellows 72 upon temperature changes. The control arm 75 cooperates with a control resistance 77, the arrangement being such that the control arm 75 traverses the control resistance 77 upon temperature changes within the room or space 10, ranging from 70° F. to 74° F. The opposite ends of the control resistance 77 and the control arm 75 are connected to the motor mechanism 71 by means of wires 78, 79 and 80. Power is supplied to the motor mechanism 71 by line wires 81. This thermostat operates to position the motor mechanism 71 in accordance with the position of the control arm 75 in respect to the control resistance 77 wherefore the valve 66 is positioned in a graduated manner and may assume any position from full closed position to full open position, depending entirely upon the temperature of the room or space 10.

The branch duct 16 is further provided with a damper 85 which is secured to a shaft 86. A crank 87 is secured to the shaft 86 and is connected to a similar crank 88 by means of a connecting link 89. The crank 88 is in turn secured to the main operating shaft 90 of a motor mechanism 91 that is controlled in a manner which will be described in detail hereinafter.

The branch duct 17 is similarly provided with a heating coil 92, the flow of heating medium through which is controlled by a valve 93. The valve 93 is provided with a valve stem 94 to which a rack 95 is secured. Cooperating with the rack 95 is a pinion 96 that is carried by the main operating shaft 97 of a motor mechanism 98. The motor mechanism 98 is controlled by a thermostat responsive to the temperature of the room or space 11. This thermostat includes a pressure responsive member in the form of a bellows 99 which has one of its ends secured to a suitable support 100. The bellows 99 is charged with a suitable volatile fluid so that it develops variable pressures therein upon changes in the temperature to which it is subjected and operates to position a bell-crank having an actuating arm 101 and a control arm 102. A spring 103 has one of its ends secured to the actuating arm 101 and its other end is secured to the support 100 and operates to oppose the variable pressures built up in the bellows 99 upon temperature changes. The control arm 102 cooperates with a control resistance 104 which has its opposite ends connected to the motor mechanism 98 by wires 105 and 106. The control arm 102 in turn is connected to the motor mechanism 98 by a wire 107. As in the case of the thermostat for the room 10, the control arm 102 completely traverses the control resistance 104 upon changes in temperature of the room or space 11, ranging from 70° F. to 74° F. The arrangement is such that the valve 93 is positioned in accordance with the position of control arm 102 in respect to its control resistance 104 wherefore the valve 93 is positioned in a graduated manner throughout its range of movement.

The branch duct 17 is further provided with a damper 110 that is secured to a shaft 111. A crank 112 is secured to the shaft 111 and is connected to a similar crank 113 by means of a link 114. The crank 113 is secured to the main operating shaft 115 of a motor mechanism 116.

The motor mechanism 116 is controlled by the conjoint action of a pair of thermostats, one of which is generally indicated at 117 and responds to the temperature of the room or space 10. The other thermostat is generally indicated at 118 and responds to the temperature of the room or space 11. The motor mechanism 116 in turn controls the motor mechanism 91.

Figure 2:
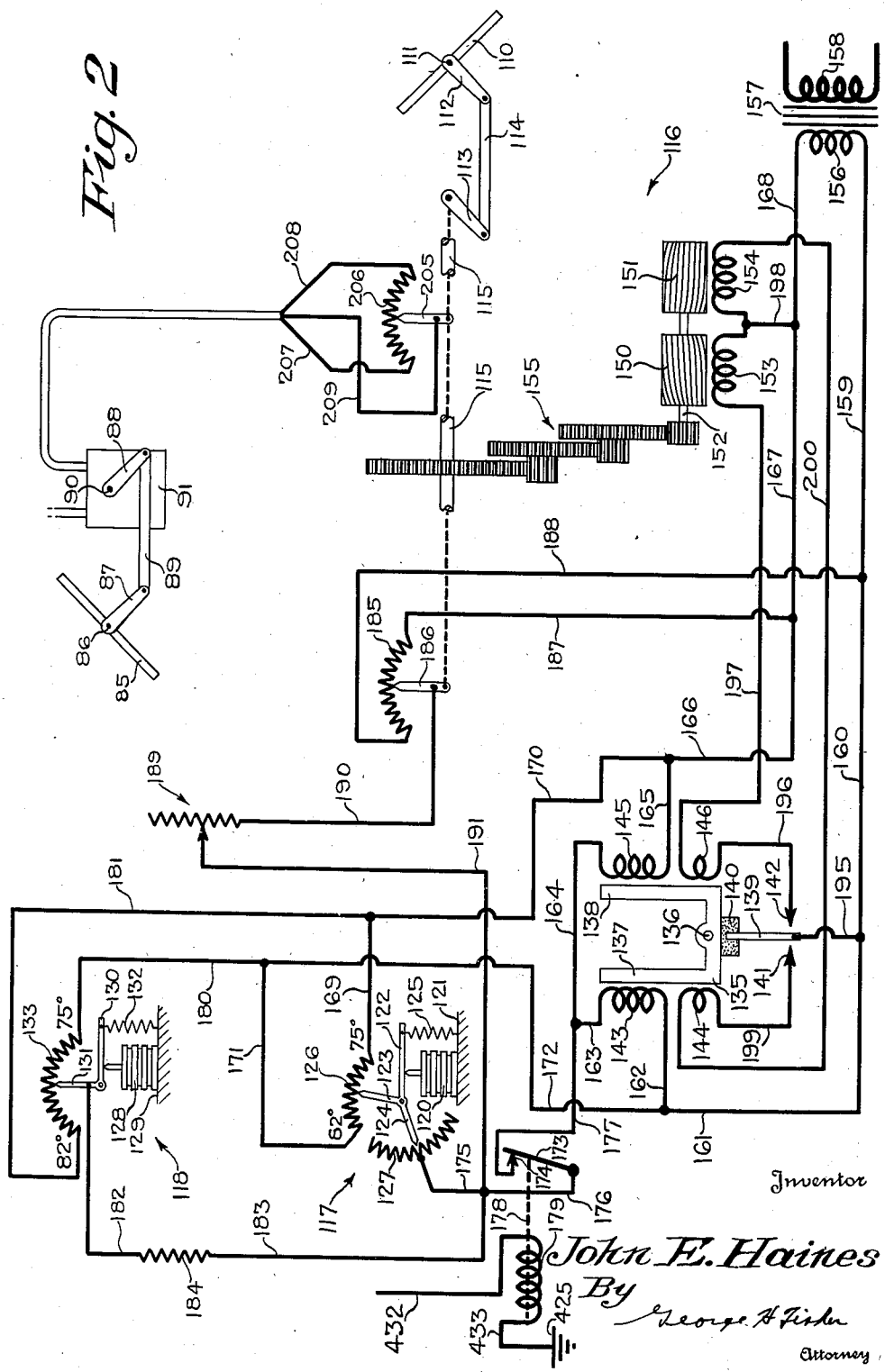
Fig. 2 is a detailed schematic showing of the manner in which the temperatures of all of the spaces cooperate in controlling the amount of conditioned air delivered thereto.

Referring to Fig. 2, the manner in which the motor mechanism 116 is controlled by the thermostats 117 and 118 and in which the motor mechanism 116 in turn controls the motor mechanism 91 will now be set forth in detail. The thermostat 117 might be termed the "controlling thermostat" and includes a pressure responsive member in the form of a bellows 120. This bellows has one of its ends secured to a suitable support 121 and operates to position a bell-crank comprising an actuating arm 122, a control arm 123, and a corrector arm 124. The bellows 120 is charged with a suitable volatile fluid so that variable pressures are created therein upon changes in the temperature to which the bellows 120 is subjected and the variable pressures thus created in the bellows 120 are opposed by a spring 125 which has one of its ends secured to the actuating arm 122 and its other end secured to the support 121. The control arm 123 cooperates with a control resistance 126 and the corrector arm 124 cooperates with a corrector resistance 127. The arrangement is such that the control arm 123 completely traverses control resistance 126 upon temperature changes in the room or space 10, ranging from 75° F. to 82° F.

The thermostat 118 might be termed a "compensating thermostat" and comprises a pressure responsive member in the form of a bellows 128 which has one of its ends secured to a suitable support 129. The bellows 128 operates to position a bell-crank that includes an actuating arm 130 and a compensating arm 131. The bellows 128 is charged with volatile fluid so that variable pressures are created therein upon temperature changes and these variable pressures are opposed by a coiled spring 132 which has one of its ends secured to the actuating arm 130, and its other end secured to the support 129. The compensating arm 131 cooperates with a compensating resistance 133, the arrangement being such that the compensating arm 131 completely traverses compensating resistance 133 upon temperature changes ranging from 75° F. to 82° F. in the room or space 11.

The motor mechanism 116 includes a relay which is provided with an armature 135 that is pivoted at 136 and is provided with legs 137 and 138. The armature 135 controls a switch arm 139 that is secured to the armature 135 through the medium of a block of insulating material 140. The switch arm 139 is adapted to cooperate with a pair of spaced contacts 141 and 142, the arrangement being such that switch arm 139 may engage either of these contacts 141 or 142 or may be disposed intermediate both of them and engaging neither of them. Cooperating with the leg 137 of the armature 135 is a main relay coil 143 and an auxiliary relay coil 144. Similarly, a main relay coil 145 and an auxiliary relay coil 146 cooperate with the leg 138 of the armature 135.

The switch arm 139 and the cooperating contacts 141 and 142 control the operation of a reversible motor means which is a part of the motor mechanism 116. The reversible motor means is herein shown as comprising two separate motors having rotors 150 and 151 which are secured to a common rotor shaft 152. Field windings 153 and 154 respectively cooperate with the rotors 150 and 151. This rotor shaft 152 is connected to the main operating shaft 115 through suitable reduction gearing indicated generally at 155.

The main relay coils 143 and 145 are normally equally energized so that the switch arm 139 is disposed intermediate the contacts 141 and 142. For this purpose, these main relay coils 143 and 145 are connected in series across the secondary 156 of a transformer 157, having a high voltage primary 158. This series circuit is as follows: from one side of secondary 156, wire 159, wire 160, wire 161, wire 162, main relay coil 143, wire 163, wire 164, main relay coil 145, wire 165, wire 166, wire 167 and wire 168 to the other side of secondary 156.

The relative energizations of the main relay coils 143 and 145 are adapted to be primarily unbalanced by the main controlling thermostat 117. For this purpose, the control resistance 126 is connected in parallel with the series connected main relay coils 143 and 145. It will be noted that the right-hand end of control resistance 126 is connected to the junction of wires 165 and 166 and is therefore connected to the lower end of main relay coil 145, by means of wires 169 and 170. Similarly, the left-hand end of control resistance 126 is connected to the junction of wires 162 and 161, and is therefore connected to the lower end of main relay coil 143, by wires 171 and 172. In addition, the center of corrector resistance 127 is connected to the junction of wires 163 and 164, and is therefore connected intermediate the main relay coils 143 and 145, through a switch comprised by a switch arm 173, and a contact 174. These connections include a wire 175, wire 176, and a wire 177. The switch arm 173 is controlled by an armature 178 which in turn is positioned by a relay coil 179. For the purposes of the present explanation, it will be assumed that the relay coil 179 is normally constantly energized, wherefore the switch arm 173 is normally in engagement with the contact 174 as shown in Fig. 2.

For the purpose of modifying the action of the thermostat 117 upon the energizations of the main relay coils 143 and 145, the thermostat 118 has its compensating resistance 133 connected in parallel with the control resistance 126 and also in parallel with the series connected relay coils 143 and 145. For this purpose, the right-hand end of compensating resistance 133 is connected to the junction of wires 171 and 172 by a wire 180 and the left-hand end of this compensating resistance 133 is connected to the junction of wires 169 and 170 by a wire 181. In addition, the compensating arm 131 of this thermostat 118 is connected to the junction of wires 163 and 164, and therefore intermediate the main relay coils 143 and 145, by being connected to the junction of wires 175 and 176 by wires 182 and 183 and through a fixed resistance 184.

Any unbalancing of the energizations of the main relay coils 143 and 145 is adapted to be eliminated and compensated for by means of a balancing potentiometer which comprises a balancing resistance 185 and a cooperating balancing contact arm 186 which is operated by the main operating shaft 115. The balancing resistance 185 is connected in parallel with the series connected main relay coils 143 and 145 by having its right-hand end connected to the junction of wires 166 and 167 by a wire 187 and by having its left-hand end connected to the junction of wires 160 and 159 by a wire 188. In addition, the balancing contact arm 186 is connected to the junction of wires 175 and 177, through a manually operable rheostat 189, by means of wires 190 and 191.

With the parts in the position shown in Fig. 2, the control arm 123 of the thermostat 117 is engaging the center of control resistance 126 and likewise the corrector arm 124 thereof is engaging the center of corrector resistance 127. Also, the compensating arm 131 of the thermostat 118 is engaging the center of compensating resistance 133. In addition, the balancing contact arm 186 is engaging the center of balancing resistance 185. Under these conditions, the main relay coils 143 and 145 are equally energized so that switch arm 139 is intermediate contacts 141 and 142. Neither of the field windings 153 nor 154 is energized and the main operating shaft 115 is stationary. Under these conditions, the damper 110 is half open so that there is an intermediate flow of air to the room or space 11. Neglecting for a moment the modifying effect of the thermostat 118 and the operation of the damper 85, and assuming that cool air is being supplied to the room or space 11, if the temperature of such room or space should rise somewhat, the control arm 123 will move along control resistance 126 towards its left-hand end. This decreases the voltage drop across main relay coil 143 and increases the voltage drop across the main relay coil 145 whereupon the armature 135 rotates in a counter-clockwise direction so as to move switch arm 139 towards contact 142. When this temperature increase in the room or space 11 has been sufficient, switch arm 139 will engage contact 142 whereupon the field winding 153 and the auxiliary relay winding 146, in series, will be energized by a circuit as follows: secondary 156, wire 159, wire 160, wire 195, switch arm 139, contact 142, wire 196, auxiliary relay coil 146, wire 197, field winding 153, wire 198, and wire 168 to the other side of secondary 156. Energization of the auxiliary relay winding 146 increases the pull on leg 138 of the armature 135 so as to hold switch arm 139 in firm engagement with contact 142. Energization of field winding 153 rotates main operating shaft 115 in such a direction that damper 110 is moved towards full open position so as to supply more of the cooled air to the room or space 11. Such movement of main operating shaft 115 also causes movement of balancing contact arm 186 along balancing resistance 185 towards the right-hand end thereof. Such movement of the balancing contact arm 186 results in an increase in the voltage drop across relay coil 143 in respect to the voltage drop across relay coil 145. When the balancing contact arm 186 is thus moved far enough along the balancing resistance 185, the pull on leg 137 of the armature 135 will become sufficiently great to separate switch arm 139 from contact 142. Immediately this occurs, the auxiliary relay coil 146 and the field winding 153 are deenergized. Deenergization of the auxiliary relay coil 146 removes some of the pull on leg 138 of armature 135 wherefore switch arm 139 separates more widely from contact 142, thereby insuring a good, clean break between this switch arm and contact. Further rotation of the main operating shaft 115 ceases, of course, upon deenergization of the field winding 153. If there should be a further rise in temperature in the room or space 11, the process set out above will be repeated and the damper 110 will move to a position allowing even more of the cooled air to flow to the room or space 11.

If, on the other hand, the temperature of the room or space 10 should drop, then the control arm 123 of the thermostat 117 will move along control resistance 126 towards its right-hand end. This movement of the control arm 123 reduces the voltage drop across the main relay coil 145 and increases the voltage drop across the main relay coil 143 so that armature 135 rotates in a clockwise direction. When this fall in temperature has been sufficient, switch arm 139 engages contact 141 whereupon the auxiliary relay coil 144 and the field winding 154, in series, are energized by a circuit as follows: secondary 156, wire 159, wire 160, wire 195, switch arm 139, contact 141, wire 199, auxiliary relay coil 144, wire 200, field winding 154, and wire 198 to wire 168 and the other side of secondary 156. Energization of the auxiliary relay coil 144 increases the pull on the leg 137 of armature 135 so as to hold switch arm 139 in firm engagement with contact 141. Energization of the field winding 154 results in rotation of main operating shaft 115 in the opposite direction so that damper 110 is moved towards closed position and balancing contact arm 186 moves along balancing resistance 185 towards its left-hand end. Such movement of the balancing contact arm 186 operates to increase the voltage drop across relay coil 145 in respect to the voltage drop across relay coil 143. When the main operating shaft 115 has thus moved sufficiently, the pull on leg 138 of armature 135 will be sufficient to disengage switch arm 139 from contact 141 so as to deenergize the auxiliary relay winding 144 and the field winding 154. Deenergization of the auxiliary relay winding 144 removes the extra force on leg 137 so that switch arm 139 separates widely from contact 141. The main operating shaft 115 ceases rotating upon deenergization of the field winding 154 wherefore the parts remain in the new position wherein damper 110 has been moved towards closed position to decrease the flow of cooled air to the space or room 11. If there should be a further decrease in the temperature of the room or space 11, the process above set out will be repeated and the damper 110 will move still further towards closed position.

The function of the rheostat 189 is to insert resistance between the balancing contact arm 186 and the connection between the main relay coils 143 and 145 so that a relatively small movement of the thermostat 117 will result in a relatively large movement of the main operating shaft 115. As a result, this rheostat 189 may be so adjusted that only a small temperature change in the room or space 11 will be required to cause a complete movement of damper 110 from its full open position to its full closed position. In other words, adjustment of rheostat 189 makes it possible to provide the thermostat 117 with an operating differential which is considerably smaller than its total differential of 75° F. to 82° F. The function of the thermostat 118 is to select that portion of the total range of operation of the thermostat 117 which will be operative to control the main operating shaft 115. In other words, the thermostat 118 shifts the operating point of the thermostat 117.

With the parts in the positions shown wherein the compensating arm 131 of the thermostat 118 is engaging the center of compensating resistance 133, the operating range of the thermostat 117 will be located in the middle of its total range. Now if the temperature of the room or space 10 should rise so that compensating arm 131 of the thermostat 118 moves along compensating resistance 133 towards its left-hand end, the voltage drop across main relay coil 145 will be decreased and the voltage drop across main relay coil 143 will be increased. This means that damper 110 must move towards closed position in order to rebalance the energizations of main relay coils 143 and 145 or else the temperature of the room or space 11 must rise to bring about a rebalanced condition. On the other hand, if the temperature of the room or space 10 should fall, the compensating contact arm 131 will move along compensating resistance 133 towards its right-hand end and cause a decrease in the voltage drop across relay coil 143 and an increase in the voltage drop across the relay coil 145 so that the damper 110 must either move towards open position or the temperature of the room or space 11 must also fall in order to bring about a balanced condition of the energizations of relay coils 143 and 145.

The main operating shaft 115 of the motor mechanism 116 operates a control arm 205 which cooperates with a control resistance 206. The opposite ends of this control resistance 206 and the control arm 205 are connected to the motor mechanism 91 by means of wires 207, 208 and 209. The arrangement is such that control arm 205 completely traverses control resistance 206 when the main operating shaft 115 moves from one of its extreme positions to its other extreme position. This control arm 205 and control resistance 206 operate to position the motor mechanism 91 and its main operating shaft 90 in accordance with the position of main operating shaft 115 of the motor mechanism 116. The arrangement is such however, that as the main operating shaft 115 causes a closing movement of damper 110, the main operating shaft 90 causes an opening movement of the damper 85.

Because of this arrangement, when the temperatures of both rooms or spaces are equal and are intermediate the range of movements of their thermostats as shown in Fig. 2, each of the dampers 110 and 85 will be half-open so that each of the rooms 11 and 10 receive half of the air being delivered by the air conditioning device 12. Now if the temperature of the room or space 11 should rise somewhat, the damper 110 will move towards open position as explained above. Likewise, the damper 85 will move a corresponding amount towards closed position. This means that more of the air will be delivered to the room or space 11 than will be delivered to the room or space 10. While this increase in the air delivery to the room or space 11 will tend to reduce its temperature, the decrease in the delivery of air to the room or space 10 will tend to allow its temperature to increase. Now if the temperature of the room or space 10 does increase, then, as pointed out above, its thermostat 118 will cause a closing movement of the damper 110 and will cause the damper 85 to move towards open position. On the other hand, if the temperature of the room or space 11 should decrease the opposite action will take place. Again, if the temperature of the room or space 11 should remain unchanged but if the temperature of the room or space 10 should rise, then the damper 110 will be moved towards closed position and the damper 85 will be moved towards open position. This increased delivery of air to the room or space 10 should tend to decrease its temperature whereas the decreased delivery of air to the room or space 11 will probably permit its temperature to rise. If it should rise, then the thermostat 117 will cause an opening movement of damper 110 and a corresponding closing movement of the damper 85. It will therefore be seen that the two thermostats 117 and 118 cooperate in the control of the two dampers 110 and 85 in a manner to position such dampers so that the temperature of the two rooms or spaces are maintained substantially equal even though such rooms or spaces are under different load conditions as by having different numbers of people congregated therein.

The function of the resistance 184 is to somewhat minimize the effect of the thermostat 118 as well as to prevent complete short-circuiting of either of the main relay coils 143 or 145 upon extreme movements of the thermostat 118 wherefore the thermostat 117 is always in dominating control of this portion of the system. The purpose of the corrector resistance 127, more and more of which is inserted in circuit with the wire 175 upon rise or fall of the temperature of the room or space 11 above or below a medium point between its total range of operation, is to tend to maintain the operating differential of this thermostat 117 substantially the same irrespective of whether this range is in the middle or near one end as a result of changes in the temperature of the room 10.

The switch arm 173 is moved from engagement with contact 174, by deenergization of relay coil 179, during those periods when heating is desired, in a manner which will shortly be described. Such separation of switch arm 173 and contact 174 disconnects the corrector resistance 127 and the compensating arm 131 from intermediate main relay coils 143 and 145. The thermostats 117 and 118 are thereby rendered inoperative to vary the voltage drops across main relay coils 143 and 145. Therefore, regardless of the positions of these thermostats, the balancing contact arm 186 must move to the center of balancing resistance 185 to maintain the voltage drops across the main relay coils 143 and 145 equal. It therefore follows that dampers 85 and 110 move to the central positions shown whenever the relay coil 179 is deenergized.

Referring again to Fig. 1 of the drawings, the air is exhausted from each of the rooms or spaces 10 or 11 to a common discharge duct 215. A fan 216 may be utilized in connection with the discharge duct 215. The mixture of air in the discharge duct 215 from the two spaces 10 and 11 is utilized during the cooling cycle of the system to control the valves 38, 39 and 40 of the cooling coils 35, 36 and 37. For this purpose, two motorized mechanisms 217 and 218, one of which is controlled by the relative humidity of the air passing through the discharge duct 215 and the other of which is controlled by the temperature of such air as modified by the temperature of the outdoor air, operate switching means in control of the valves 38, 39 and 40. These switching mechanisms also control the compressor motor 46.

The motor mechanism 217 is provided with a main operating shaft 219 to which three cams 220, 221 and 222 are secured. The cam 220 is provided with an operating portion 223 which is adapted to move a switch arm 224 into engagement with a contact 225. Similarly, the cam 221 is provided with an operating portion 226 which is adapted to move a switch 227 into engagement with a contact 228. In a like manner, the cam 222 is provided with an operating portion 229 which is adapted to move a switch arm 230 into engagement with a stationary contact 231. Each of these switches controls the energization of one of the valves 38, 39 and 40 and also controls a circuit to a three-speed starting box 232 by means of which the compressor motor 46 is operated at varying speeds.

The motor mechanism 218 is provided with a main operating shaft 235 upon which is mounted cams 236, 237 and 238. The cam 236 is provided with an operating portion 239 which is adapted to engage a switch arm 240 and move the same into engagement with the stationary contact 241. Similarly, the cam 237 is provided with an operating portion 242 which is arranged to engage a switch arm 243 and move the same into engagement with a stationary contact 244. In a like manner, the cam 238 is provided with an operating portion 245 which engages a switch arm 246 and moves the same into engagement with a stationary contact 247. Each of these three switches likewise controls a circuit to one of the valves 38, 39 and 40 and a circuit to the three-speed starting box 232.

Referring now to Fig. 3 of the drawings, the manner in which the main operating shaft 235 of the motor mechanism 218 is controlled, as well as the manner in which this main operating shaft 235 in turn controls the motor mechanism 60, will be explained in detail. The motor mechanism 218 includes a reversible motor means herein shown in the form of two oppositely acting motors each of which comprises a rotor and a field winding. Each of these rotors, which are designated at 250 and 251, is secured to a common rotor shaft 252. The associated field windings are indicated at 253 and 254. This rotor shaft 252 is connected to the main operating shaft 235 through a suitable reduction gearing generally indicated at 255. The motor mechanism 218 includes a relay that is provided with an armature 256 which is pivoted at 257 and is provided with two legs 258 and 259. This armature 256 controls a switch arm 260 which is secured to the armature 256 through the medium of a block of insulating material 261. The switch arm 260 cooperates with a pair of spaced contacts 262 and 263 which it is adapted to selectively engage. Associated with the leg 258 of the armature 256 is a main relay coil 264 and an auxiliary relay coil 265. In a like manner, a main relay coil 266 and an auxiliary relay coil 267 are associated with the leg 259 of the armature 256. These main relay coils 264 and 266 are normally equally energized by being connected in series across the secondary 268 of a transformer 269 having a high voltage primary 270. This circuit is as follows: secondary 268, wire 269, wire 270, wire 271, wire 272, main relay coil 264, wire 273, wire 274, main relay coil 266, wire 275, wire 276, wire 277, and wire 278 to the other side of secondary 268.

The energizations of these main relay coils 264 and 266 are adapted to be primarily unbalanced by means of a thermostatic control, generally indicated at 279, which responds to the temperature of the air passing through the discharge duct 215 wherefore it responds to the average temperature of the air in the two rooms or spaces 10 and 11. This thermostat 279 includes a pressure responsive member 280 in the form of a bellows which has one of its ends secured to a suitable support 281. This bellows 280 is connected to a controlling bulb 282 by means of a connecting tube 283. As shown in Fig. 1, the controlling bulb 282 is located in the discharge duct 215. The bellows, bulb and tube are charged with a suitable volatile fluid which generates pressures in the system that are commensurate with the temperature to which the bulb 282 is subjected. The free end of bellows 280 operates to position a bell-crank which includes an actuating arm 284, a control arm 285, and a corrector arm 286. A spring 287 opposes the variable pressures in the bellows 280 and has one of its ends secured to the actuating arm 284 and its other end secured to the support 281. The control arm 285 cooperates with a control resistance 288 and the corrector arm 286 cooperates with a corrector resistance 289. The control resistance 288 is connected in parallel with the series-connected main relay coils 264 and 266 by having its left-hand end connected to the junction of wires 271 and 272 by means of wires 290 and 291 while its right-hand end is connected to the junction of wires 275 and 276 by wires 292 and 293. The center of corrector resistance 289 is connected to the junction of wires 273 and 274 by wires 294 and 295 wherefore the center of this corrector resistance 289 is connected intermediate the main relay coils 264 and 266.

The effect of the main controlling thermostat 279 upon the respective energizations of the main relay coils 264 and 266 is modified by a compensating thermostat generally indicated at 300 which responds to the temperature of the outdoor atmosphere. This thermostat comprises a pressure responsive member in the form of a bellows 301 which has one of its ends secured to a suitable support 302. The bellows is connected to a controlling bulb 303 by a tube 304. This controlling bulb 303 may be placed out of doors or, as shown in Fig. 1 of the drawings, it may be conveniently located in the intake or inlet duct 13 of the air conditioning device 12. The free end of bellows 301 positions a bell-crank which includes an actuating arm 305 and a control arm 306. The bellows, controlling bulb and tube are charged with a suitable volatile fluid by reason of which variable pressures are created in the system upon temperature changes and these variable pressures are opposed by a spring 307 which has one of its ends secured to the actuating arm 305 and its other end secured to the support 302. The compensating arm 306 cooperates with a compensating resistance 308 which is connected in parallel with the series-connected main relay coils 264 and 266, as well as in parallel with the control resistance 288, by having its right-hand end connected to the junction of wires 290 and 291 by a wire 309 and its left-hand end connected to the junction of wires 292 and 293 by a wire 310. The compensating arm 306 is connected to the junction of wires 294 and 295, through a fixed resistance 311, by wires 312 and 313.

The energizations of the main relay coils 264 and 266 are adapted to be rebalanced, irrespective of what causes their unbalancing, by means of a balancing potentiometer comprising a balancing resistance 314 and a cooperating balancing contact arm 315 which is secured to and positioned by the main operating shaft 235. The balancing resistance 314 is connected in parallel with the series-connected main relay coils 264 and 266 by having its lower end connected to the junction of wires 269 and 270 by a wire 316 and its upper end connected to the junction of wires 276 and 277 by a wire 317. The balancing contact arm 315 is connected to the junction of wires 294 and 295, through a manually operable rheostat 318, by wires 319 and 320.

The range of the main controlling thermostat 279 is 75° F. to 82° F. so that the control arm 285 completely traverses the control resistance 288 upon a temperature change of this amount. The range of the compensating thermostat 300 is such that the compensating arm 306 completely traverses the compensating resistance 308 upon changes in outside temperature, ranging 75° F. to 100° F. With the parts in the position shown, the temperature of the air in the discharge duct 215 is intermediate 75° F. and 82° F. or approximately 78½° F. and the temperature of the outside air is intermediate 75° F. and 100° F. or approximately 87½° F. Under these conditions, the control arm 285 is engaging the center of control resistance 288 and the compensating arm 306 is engaging the center of compensating resistance 308. The balancing contact arm 315 is engaging the center of balancing resistance 314 wherefore the two relay coils 264 and 266 are substantially energized and the switch arm 260 is intermediate the contacts 262 and 263. With the parts in this position, the main operating shaft 235 is intermediate its extreme positions.

If the temperature of the air passing through the discharge duct 215 should rise, the control arm 285 of the main controlling thermostat 279 will move along control resistance 288 towards its left-hand end whereby the voltage drop across main relay coil 264 will be decreased and the voltage drop across the main relay coil 266 will be increased. The armature 256 will therefore be rotated in counter-clockwise direction and switch arm 260 will move towards contact 263. When this rise in temperature of the air passing through the discharge duct 215 has been sufficient, switch arm 260 will engage contact 263 whereupon the auxiliary relay coil 267 and the field winding 253, in series, will be energized as follows: secondary 268, wire 269, wire 270, wire 325, switch arm 260, contact 263, wire 326, auxiliary relay coil 267, wire 327, field winding 253, wire 328 and wire 278 to the other side of secondary 268. The energization of the auxiliary relay coil 267 exerts an additional attractive force on the leg 259 of armature 256 wherefore the switch arm 260 is held in firm engagement with contact 263. Energization of field winding 253 causes main operating shaft 235 to rotate in a clockwise direction, as viewed from the right, and also causes balancing contact arm 315 to move upwardly along balancing resistance 314. Such movement of the balancing contact arm 315 lowers the voltage drop across main relay winding 266 and increases the voltage drop across main relay winding 264. When sufficient movement of main operating shaft 235 has taken place, the relay winding 264 exerts sufficient pull on the leg 258 of armature 256 to move switch arm 260 from engagement with contact 263. When this occurs, the circuit through the auxiliary relay winding 267 and through the field winding 253 is interrupted. Deenergization of auxiliary relay winding 267 removes the additional pull or attractive force on leg 259 of the armature 256 wherefore switch arm 260 separates more widely from contact 263 to insure a good, clean break. Further rotation of main operating shaft 235 ceases, of course, upon deenergization of the field winding 253. In this manner, a rise in the temperature of the mixture of air discharged from the two rooms or spaces 10 and 11 causes a rotation of the main operating shaft 235 of the motor mechanism 218 in a clockwise direction, as viewed from the right.

If the temperature of the air passing through the discharge duct 215 should fall, then the control arm 285 of the main controlling thermostat 279 will move along control resistance 288 towards its right-hand end which will cause a decrease in the voltage drop across main relay coil 266 and an increase in the voltage drop across the main relay coil 264. The armature 256 will therefore rotate in a clockwise direction and move switch arm 260 towards the contact 262. When this temperature drop has been sufficient, the switch arm 260 engages contact 262 whereupon the auxiliary relay coil 265 and the field winding 254, in series, are energized as follows: secondary 268, wire 269, wire 270, wire 325, switch arm 260, contact 262, wire 329, auxiliary relay coil 265, wire 330, field winding 254, wire 328 and wire 278 to the other side of secondary 268. Energization of the auxiliary relay coil 265 exerts an additional pull on leg 258 of the armature 256 wherefore the switch arm 260 is held in firm engagement with contact 262. Energization of the field winding 254 causes rotation of main operating shaft 235 in a counter-clockwise direction as viewed from the right, and also causes movement of balancing contact arm 315 downwardly along balancing resistance 314. This movement of balancing contact arm 315 downwardly along balancing resistance 314 tends to increase the voltage drop across main relay coil 266 and decrease the voltage drop across main relay coil 264, and, when the main operating shaft 235 has thus rotated sufficiently far, switch arm 260 separates from contact 262. This deenergizes auxiliary relay coil 265 and the field winding 254. The deenergization of auxiliary relay coil 265 removes the additional attractive force on leg 258 of the armature 256 whereupon the switch arm 260 separates more widely from contact 262. Further rotation of main operating shaft 235 ceases upon deenergization of field winding 254. In this manner, a fall in the temperature of the air passing through the discharge duct 215 causes a corresponding counter-clockwise rotation of the main operating shaft 235.

The manually operable rheostat 318 permits the insertion of resistance in circuit with the balancing contact arm 315 which in turn causes a larger movement of the main operating shaft 235 to be necessary in order to rebalance the energizations of the main relay windings 264 and 266. By properly adjusting this rheostat 318, a relatively small movement of the control arm 285 of the main controlling thermostat 279 will result in a complete movement of the main operating shaft 235 from one of its extreme positions to its other extreme position. In this manner, the operating differential of this main controlling thermostat 279 can be made and is made considerably less than its total differential or total range of movement.

The compensating thermostat 300 serves to shift the operating range of the main controlling thermostat 279. For example, if the outdoor temperature should rise so that compensating arm 306 moves along compensating resistance 308 towards its left-hand end, the voltage drop across relay winding 266 is reduced whereas the voltage drop across the relay winding 264 is increased. As a result, the main control arm 285 must move to the left along control resistance 288 in order for the main relay windings 264 and 266 to be substantially equally energized when the main operating shaft 235 is in its center position. In other words, the control point of the main controlling thermostat 279 is raised as the result of a rise in outdoor temperature. The reverse is true on a fall in outdoor temperature so that the control point of the main controlling thermostat 279 is lowered as the outdoor temperature falls. As a result, when the outdoor temperature is at 75° F., the main controlling thermostat will control at approximately 75° F. to cause clockwise movement of main operating shaft 235 to one of its extreme positions upon a slight rise in temperature above 75° F. and to cause a counter-clockwise movement thereof to its opposite extreme position upon a slight fall in temperature below 75° F. Also, when the outdoor temperature is substantially 87½° F., as shown in Fig. 3, then the main controlling thermostat 279 will have its control point shifted to substantially 78½° F. as also shown in Fig. 3. If the outdoor temperature should rise to 100° F., then the control point of the main operating thermostat 279 will be shifted to substantially 82° F.

The resistance 311 which is connected in circuit with the compensating arm 306 of the compensating thermostat 300 not only prevents complete short-circuiting of either of the relay coils 264 and 266 upon extreme movements of the main compensating thermostat 300 but also modifies its effect to such an extent that the main controlling thermostat 279 will always have dominating control of the energizations of the relays 264 and 266. The corrector resistance 289, a portion of which is placed in circuit with the corrector arm 286 upon a rise or fall in temperature above or below the 87½° F. value, serves to maintain the operating differential of the main controlling thermostat 279 substantially constant even though its control point be shifted back and forth between the 75° F. value and the 82° F. value.

From the foregoing, it will now be apparent that a slight change in the temperature of the air passing through the discharge duct 215 is sufficient to cause movement of main operating shaft 235 from one of its extreme positions to its other extreme position. The particular point at which this controlling action will take place depends upon the outside temperature, and by reason of the temperature values selected, it will be noted that the differential between the inside and outside temperature is increased as the outdoor temperature rises.

The movements of main operating shaft 235 are utilized to control the motor mechanism 60 which positions the dampers 51 and 52 that in turn determine the proportions of air which will flow through the reheating chamber 43 and the by-pass chamber 42. In order to accomplish this, the main operating shaft 235 positions a control arm 335 which cooperates with a control resistance 336. The control arm 335 and the control resistance 336 are connected to the motor mechanism 60 by means of wires 337, 338 and 339. The motor mechanism 60 is so positioned corresponding to the position of the control arm 335 in respect to its control resistance 336, and the arrangement is such that the damper 51 is moved from full open position to full closed position and the damper 52 is moved from full closed position to full open position when control arm 335 moves from the lower end of control resistance 336 to its upper end.

With the main operating shaft 235 in the intermediate position shown, all the cam operated switches associated therewith are open and the control arm 335 is disposed slightly below the lower end of the control resistance 336. Upon slight clockwise movement of main operating shaft 235, as viewed from the right, the operating portion 239 of cam 236 moves switch arm 240 into engagement with contact 241. Upon further movement of main operating shaft 235 in the same direction to a position in which control arm 335 is disposed downwardly at an angle of about 45°, the operating portion 242 of cam 237 moves switch arm 243 into engagement with contact 244. Upon further clockwise movement of main operating shaft 235 to its one extreme position, the operating portion 245 of cam 238 moves switch arm 246 into engagement with contact 247. Upon return movement of main operating shaft 235 to its intermediate position in which it is shown, these switches sequentially open.

A slight movement of main operating shaft 235 from its intermediate position shown in a counter-clockwise direction, as viewed from the right, causes movement of the control arm 335 into engagement with the lower end of control resistance 336. Further movement of main operating shaft 235 in the same direction progressively moves control arm 335 upwardly along control resistance 336 and all of this resistance will have been transversed when the main operating shaft 235 reaches its other extreme position. This movement of control arm 335 operates motor mechanism 60 to move damper 51 from its full open position to its full closed position and to move damper 52 from its full closed position to its full open position.

From the foregoing, it will be apparent then that half of the movement of main operating shaft 235 is utilized to progressively open and close the associated cam operated switches and the other half of the movement of main operating shaft 235 is utilized to operate the mixing dampers 51 and 52 through the medium of the motor mechanism 60 and the control potentiometer comprised by control arm 335 and control resistance 336.

Returning again to Fig. 1 of the drawings, the motor mechanism 217 is controlled by a relative humidity responsive controller generally indicated at 345. This comprises a relative humidity responsive element 346 which may take the form of a plurality of strands of human hair, one end of each of which is secured to a support or bracket 347, whereas the other end of each is secured to a support or bracket 348. The bracket 347 is anchored in any suitable manner and is herein shown as being fastened to the wall of the discharge duct 215. The bracket 348 operates a bell-crank by being connected to the actuating arm 349 thereof. A spring 350 operates to keep the humidity responsive element 346 under tension at all times and has one of its ends secured to the actuating arm 349 and its other end secured to a suitable support 351. The bell-crank also includes a control arm 352 which cooperates with a control resistance 353. The opposite ends of the control resistance 353 and the control arm 352 are all connected to the motor mechanism 217 by wires 254, 255 and 256. This humidity responsive controller has a range of from 40% to 50%, and with the parts in the position shown, the relative humidity of the air passing through the discharge duct 215 is approximately 45% wherefore the control arm 352 is engaging the center of control resistance 353. As a result, the main operating shaft 219 of the motor mechanism 217 is in an intermediate position. It is thought that it will now be clear that the main operating shaft 219 of this motor mechanism 217 is positioned in accordance with the movements of the control arm 352. When the main operating shaft 219 is in the mid-position shown, the switch arm 224 is engaging the contact 225. This main operating shaft 219 controls its associated switch arms in the same general manner as does the main operating shaft 235 control its switch arm except that the full movement of main operating shaft 219 is used to operate its switches whereas only half of the movement of main operating shaft 235 is used to operate its switches. In other words, with the main operating shaft 219 in its extreme position after having rotated in a counter-clockwise direction as viewed from the right, all of the three associated switches are opened. This condition of the parts takes place when the relative humidity is at approximately 40%. If the relative humidity now rises slightly, the main operating shaft 219 rotates slightly in a clockwise direction whereupon the operating portion 223 of the cam 220 moves switch arm 224 into engagement with the contact 225, as shown. As the relative humidity continues to rise and reaches about 45%, the operating portion 226 of the cam 221 moves switch arm 227 into engagement with contact 228. When the relative humidity rises to substantially 50%, then the main operating shaft 219 has moved to its other extreme position and the operating portion 229 of the cam 222 moves switch arm 230 into engagement with contact 231.

The preheating coil 21, which is located in the preheating chamber 19, is supplied with any suitable source of heating medium by means of a supply pipe 360 which communicates with two branch pipes 361 and 362. These branch supply pipes in turn communicate with the preheating coil 21. An electrically operable valve 363 controls the flow of heating fluid through the branch pipe 361 and a similar electrically operable valve 365 controls the flow of heating fluid through the branch pipe 362.

The valve 363 is controlled by an outdoor temperature responsive thermostat that includes a bellows 366 which is secured to a suitable support 367. This bellows is connected to a controlling bulb 368 by a connecting tube 369. The bellows 366 positions a switch carrying arm 370 that supports a mercury switch 371. A spring 372 connects the switch carrying arm 370 and the support 367 and operates to oppose the variable pressures created within the bellows 366 by the volatile fluid with which the bellows, bulb and connecting tube are charged. The bulb 367 responds to the temperature of the outside air and may be conveniently located in the intake duct 13 as shown in Fig. 1. The setting of this thermostat is such that the mercury switch 371 is in the position shown whenever the outside temperature is at or about 50° F. When in this position, a closing circuit for the valve 363 is established as follows: line wire 373, mercury switch 371, wire 374, valve 363 and line wire 375. If the outdoor temperature falls to 50° F. or therebelow, then the mercury switch 371 moves to the position opposite that shown so that the mercury thereof is in its right-hand end whereupon a valve opening circuit for the valve 363 is established as follows: line wire 373, mercury switch 371, wire 376, valve 363, and line wire 375.

The valve 365 is controlled by a similar thermostat that includes a bellows 380 which is secured to a suitable support 381. A control bulb 382 is connected to the bellows 380 by means of a tube 383. The bellows 380 positions a switch carrying arm 384 which supports a mercury switch 385. A spring 386 has one of its ends secured to the switch carrying arm 384 and its other end secured to the support 381 and serves to oppose the variable pressures built up in the bellows 380 by the volatile fluid with which the bellows and its associated control bulb, as well as the connecting tube are charged. The control bulb 382 of this thermostat likewise responds to outdoor temperature and may be located in the fresh air inlet duct 13. The adjustment of the thermostat is such that the mercury switch 385 remains in the position shown in Fig. 1 so long as the outdoor temperature is at or above approximately 30° F. When the mercury switch 385 is in such position, a valve closing circuit is established for valve 365 by a circuit as follows: line wire 386, mercury switch 385, wire 387, valve 365, and line wire 388. Whenever the outdoor temperature falls below 30° F., the mercury switch 385 moves to the opposite position wherein the mercury thereof is in its right-hand end, whereupon a valve opening circuit is established for valve 365 as follows: line wire 386, mercury switch 385, wire 389, valve 365, and line wire 388.

The valves 363 and 365 may be of the same size or may be of different sizes and the temperatures at which these controlling thermostats operate may be varied, all depending upon the particular conditions to be controlled and the locality in which the installation is made. With the values given above, it will be seen that no heating fluid whatsoever is supplied to the preheating coil 21 as long as the outdoor temperature is at or above 50° F. When the outdoor temperature is between 30° F. and 50° F., the valve 363 is opened so that an intermediate supply of heating medium is allowed to pass to the preheating coil 21. When the outdoor temperature falls below 30° F., then both valves 363 and 365 are opened so that a full supply of heating medium is delivered to the preheating coil 21.

The motor means 31 which controls the positions of the inlet dampers 22 and 23 that in turn determine the proportions of air which will flow through the preheating chamber 19 and the by-pass chamber 20, is controlled by a thermostatic mechanism responsive to the temperature of the air passing through the delivery duct 15. This thermostat is generally indicated at 395 and includes a bellows 396 which has one of its ends secured to a support 397. This bellows 396 is connected to a controlling bulb 398 by means of a connecting tube 399. The bellows 396 positions a bell-crank which includes an actuating arm 400, with which the bellows 396 directly cooperates, and a control arm 401. A spring 402 has one of its ends secured to the actuating arm 400 and its other end secured to the support 397 and serves to oppose the variable pressures created in bellows 396 by the volatile fluid with which such bellows, as well as the controlling bulb and connecting tube, are charged. The control arm 401 cooperates with a control resistance 403. The opposite ends of this control resistance 403 and the control arm 401 are all connected to the motor mechanism 31 by means of wires 404, 405 and 406. The thermostat 395 has a relatively small range and its control arm 401 traverses the associated control resistance 403 on small temperature changes above and below 60° F. When the control arm 401 engages the extreme right-hand end of control resistance 403 by reason of a low temperature in the duct 15, the motor mechanism 31 is positioned so that the damper 23 is completely open and the damper 22 is completely closed, so that all of the fresh air being delivered to the air conditioning device 12 must pass over the preheating coil. As the temperature in the duct 15 rises, so that control arm 401 moves along control resistance 403 towards its left-hand end, this damper 23 moves toward closed position and the damper 23 moves towards open position to permit part of the air to by-pass around the preheating coil 21. When the temperature of the air in the duct 15 is slightly above 60° F. so that control arm 401 engages the extreme left-hand end of resistance 403, then the motor mechanism 31 positions the dampers 22 and 23 so that the damper 23 is completely closed and the damper 22 is full open. Under these conditions, none of the fresh air entering the air conditioning device 12 passes over the preheating coil 21 and all of it by-passes therearound, going by way of the by-pass chamber 20.

In view of the previous detailed description of the manner in which the motor mechanism 116 is controlled by its main controlling thermostat 117 and in view of the similar description in detail of the manner in which the motor mechanism 218 is controlled by its main controlling thermostat 279, it is thought that it will now be evident as to how the motor mechanisms 31, 60, 71, 91 and 98 are positioned by their respective controllers. However, if it should be desired to have these motors of the mechanical follow-up type instead of the electrically balanced type, reference may be had to the patent to Lewis L. Cunningham granted February 5, 1935, No. 1,989,972. Also, it is thought that the detailed description relative the motor mechanisms 116 and 218 indicate the manner in which the associated compensating controls vary the action of the main controlling thermostats. However, if desired, reference may be had to the copending application of John E. Haines, Serial No. 38,946, filed September 3, 1935, wherein compensated circuits such as this are disclosed generally, as well as specifically.

The control system of the present invention further includes an outdoor temperature responsive thermostat, generally indicated at 410, which serves to place certain of the apparatus into and out of operation, depending upon whether a cooling cycle or a heating cycle is desired. This thermostat 410 includes a bellows 411 which has one of its ends secured to a suitable support 412. The bellows 411 is connected to a controlling bulb 413 by means of a connecting tube 414. This bulb 413 responds to the temperature of the outside air and may be located in the fresh air inlet duct 13, as shown in Fig. 1. The free end of bellows 411 positions a switch carrying arm 415 which supports a mercury switch 416. A spring 417 has one of its ends secured to the switch carrying arm 415 and its other end secured to the support 412 and serves to oppose the variable pressures created in bellows 411 by reason of the volatile fluid with which it, as well as the controlling bulb 413, is charged. This thermostat 410 serves to control the flow of power to the various switches operated by the motor mechanisms 217 and 218 and also controls the flow of power to the relay coil 179 which has been previously described in connection with Fig. 2.

The fan 14 may be operated by a suitable motor such as the electric motor indicated at 420 and the fan 216 may be operated by a similar motor indicated at 421. Electrical power is furnished by line wires 422 and 423, the flow of power from such line wires being controlled by a manually operable switch 424. Line wire 423 leaving the switch 424 has been shown as grounded at 425 for convenience of illustration.

*Operation of the complete system*

With the parts in the position shown, the outdoor temperature is approximately 87½° F., the temperature of each of the rooms or spaces 10 and 11 is approximately 78½° F., the temperature of the mixture of air flowing through the discharge duct 215 is approximately 78½° F., and the relative humidity thereof is approximately 45%. Since the temperature of the outdoor air is at this relatively high value, both the valves 363 and 365 are closed and no heating fluid is being supplied to the preheating coil 21. The temperature of the air being delivered by the fan 14 will vary by reason of the control action to be explained hereinafter. This however, while it causes operation of the motor mechanism 31 to variably position the inlet mixing dampers 22 and 23, has no effect upon the operation of the system during the cooling cycle because it makes no difference whether the fresh air passes through the preheating chamber 19 or the by-pass chamber 20 since no heating fluid is being supplied to the preheating coil 21.

Also by reason of this relatively high outdoor temperature, the mercury switch 416 is closed. The manual switch 424 is also closed. As a result, both fan motors 420 and 421 are energized, the relay coil 179 is energized, and power is available to the switches associated with the two motor mechanisms 217 and 218. The circuit for fan motor 420 is as follows: line wire 422, manual switch 424, wire 426, fan motor 420 and ground 425. The circuit for fan motor 421 is as follows: line wire 422, manual switch 424, wire 427, wire 428, fan motor 421, wire 429 and ground 425. The energizing circuit for relay coil 179 is as follows: line wire 422, manual switch 424, wire 427, wire 430, mercury switch 416, wire 431, wire 432, relay coil 179, wire 433, and ground 425. The two fans 14 and 216 are therefore operating to cause the passage of air through the air conditioning device 12, to the two rooms or spaces 10 and 11, and out through the discharge air duct 215. Also, since the relay coil 179 is energized, the switch arm 173 is engaging contact 174 so that the two room thermostats 117 and 118 are operative to position the dampers 85 and 110 in a manner to maintain the temperature of both of these rooms equal, as explained in detail in connection with Fig. 2.

None of the switches associated with the motor mechanism 218 is closed but, since the relative humidity is at 45%, the main operating shaft 219 of the motor mechanism 217 is in its intermediate position wherefore switch arm 224 is engaging contact 225. Engagement of these parts establishes an energizing circuit for the electrically operable valve 40 and also establishes a low speed circuit to the three-speed control box 232. This circuit for electrically operable valve 40 and the three-speed control box 232 is as follows: line wire 422, manual switch 424, wire 427, mercury switch 416, wire 431, wire 434, wire 435, switch arm 224, contact 225 and wire 436, at which point the circuit branches, one portion going by way of wire 443 to the three-speed control box 232 and thence to ground 425 by a wire 444, whereas the other portion goes by way of wire 437, electrically operable valve 40, wire 438, wire 439 and 440 to ground 425. The compressor motor 46 is therefore being operated at low speed so that it is supplying a small amount of hot gaseous refrigerant to the reheating coil 44 after which it passes to the condenser 48. The liquefied refrigerant then flows to the cooling coil 37 and back to the compressor 45. Although the reheating coil is thus being heated, so long as the temperature of the discharged air in the duct 215 remains unchanged, the motor mechanism 218 will remain in the position shown wherein the control arm 335 is disengaged from the control resistance 336 so that the motor mechanism 60 is positioned to maintain the damper 52 closed and the damper 51 completely open. Therefore, all of the air passing through the air conditioning device 12 is by-passed around the reheating coil 44 and receives no heat therefrom. The air passing over the cooling coil 37 is lowered in temperature in order to provide a dehumidifying action and this air is then delivered to the rooms or spaces 10 and 11 in proportions determined by the positions of dampers 85 and 110.

Assuming that the relative humidity of the air being discharged from the spaces 10 and 11 rises, which could result from any number of reasons, then the control arm 352 of the relative humidity controller 345 will move along control resistance 353 towards its right-hand end and cause the main operating shaft 219 of the motor mechanism 217 to rotate in a clockwise direction as viewed from the right. Such clockwise rotation will cause operating portion 226 of cam 221 to move switch arm 227 into engagement with contact 228. Engagement of these parts establishes a circuit to the electrically operable valve 39 and also establishes a medium speed circuit for the compressor motor 46 through the three speed control box 232. This circuit arrangement is as follows: line wire 422, manual switch 424, wire 427, wire 430, mercury switch 416, wire 431, wire 434, wire 450, switch arm 227, contact 228 and wire 451, at which point the circuit branches, part going by way of wire 452, three-speed control box 232 and wire 444 to ground 425, whereas the other portion goes by way of wire 453, electrically operable valve 39, wire 454, wire 439, and wire 440 to ground 425. The compressor 45 is thereupon operated at a greater speed and supplies more refrigerant, part of which now passes through the cooling coil 36, as well as through the cooling coil 37. This additional cooling surface causes a further reduction in the temperature of the air passing through the air conditioning device 12 to remove more moisture therefrom in an effort to check the rising humidity in the air passing through the discharge duct 215.

If the humidity of this air should increase still further so that control arm 352 moves to the right-hand end of control resistance 353, then main operating shaft 219 of the motor mechanism 217 will move to its extreme position, while moving in a clockwise direction as viewed from the right, whereupon the operating portion 229 of the cam 222 moves switch arm 230 into engagement with contact 231. Engagement of these parts establishes an energizing circuit for the electrically operable valve 38 and establishes a high-speed circuit to the three-speed starting box 232. This circuit is as follows: line wire 422, manual switch 424, wire 427, mercury switch 416, wire 431, wire 434, wire 455, switch arm 230, contact 231, wire 456, and wire 457, at which point the circuit branches, one portion going by way of wire 458 to the three-speed starting box 232 and wire 444 to ground 425, whereas the other portion goes by way of wire 459, electrically operable valve 38, wire 460 and wire 440 to ground 425. The compressor 45 is now operated at high speed and the large quantity of refrigerant thus produced flows through each of the three cooling coils 35, 36 and 37. This will cause an even greater reduction in the temperature of the air passing through the air conditioning device 12 and should restore the relative humidity to a lower value.

Whenever any or all of these cooling coils are thus being operated by reason of excessive relative humidity conditions while the temperature of the air in the discharge air duct 215 is not above the value determined by thermostat 279 as modified by thermostat 300, the temperature of this discharged air may be lowered below such setting of the thermostat 279. If this should occur, the control arm 285 of this thermostat 279 will move along control resistance 288 towards its right-hand end whereupon the main operating shaft 235 of the motor mechanism 218 will be rotated in a counter-clockwise direction as viewed from the right. Such movement of the main operating shaft 235 away from its intermediate position will cause control arm 335 to move upwardly along control resistance 336 wherefore motor mechanism 60 will be operated to move damper 52 towards open position and damper 51 towards closed position. Part of the air leaving the cooling coils is thus diverted through the reheating chamber 43 and over the reheating coil 44. The hot gaseous refrigerant flowing through this reheating coil 44 will thereupon raise the temperature of this portion of the cooled air so as to restore the temperature of the mixture of air passing out of the discharge duct 215. The lower the temperature of this air falls below the particular operating point of the thermostat 279 for the outdoor conditions prevailing, the more of the cooled air will be passed through the reheating chamber 43 and over the reheating coil 44. If the temperature falls too low, the damper 52 will be moved to full open position and the damper 51 will be moved to full closed position wherefore all of the air leaving the cooling coils will be reheated before being delivered to the rooms or spaces 10 and 11.

If the temperature of the air passing through the discharge duct 215 should rise above the particular control point of the thermostat 279, then the main operating shaft 235 of the motor mechanism 218 will move in the opposite direction and first moves switch arm 240 into engagement with contact 241. This will establish an energizing circuit for the electrically operable valve 40 and a low-speed circuit for the three-speed control box 232. Such circuits may already be completed by the motor mechanism 217 if the relative humidity is high, but if the relative humidity is low at such time, then these are the only circuits for this valve and three-speed control box. This circuit is as follows: line wire 422, manual switch 424, wire 427, wire 430, mercury switch 416, wire 431, wire 434, wire 441, switch arm 240, contact 241, wire 442 and wire 436, at which point the circuit branches, one portion going by way of wire 443 to the three-speed control box 232 and wire 444 to ground 425, whereas the other portion goes by way of wire 437, electrically operable valve 40, wire 438, wire 439, and wire 440 to ground 425. The compressor again will be operated at low speed, assuming the relative humidity is low, and the refrigerant thus produced will flow through the cooling coil 37. The air passing through the air conditioning device 12 will thereby be cooled and this cooled air will be delivered to the rooms or spaces 10 and 11 in proportions determined by the setting of dampers 85 and 110 and the mixture of the air leaving these rooms or spaces passes out the discharge duct 215 and over the humidity controller and temperature control bulb 282. Under these conditions, the damper 51 will again be fully opened and the damper 52 will be completely closed, it being remembered in connection with the description of Fig. 3 that the motor mechanism 218 is so arranged that when it operates its associated switches, the control arm 335 is completely beyond the control resistance 336.

If the temperature of this discharged air should rise further, main operating shaft 235 will rotate to a greater extent in clockwise direction and the operating portion 242 of cam 237 will move switch arm 243 into engagement with contact 244. A circuit for valve 39 and a medium speed circuit for the three-speed control box 232 is thereupon established as follows: line wire 422, manual switch 424, wire 427, wire 430, mercury switch 416, wire 431, wire 434, wire 461, switch arm 243, contact 244, wire 462 and wire 451, whereupon the circuit branches, one portion going by way of wire 452 and three-speed control box 232, and wire 444 to ground 425, whereas the other portion goes by way of wire 453, electrically operable valve 39, wire 454, wire 439, and wire 440 to ground 425. The compressor 45 is now operated at a medium speed and part of the refrigerant thus produced flows to the cooling coil 37 and the other portion flows to the cooling coil 36. The temperature of the air being delivered to the rooms 10 and 11 is thereby further reduced in an effort to lower the temperature of the mixture of air discharged therefrom. If this temperature should rise even higher, main operating shaft 235 will move to its extreme position as the result of clockwise rotation and operating portion 245 of cam 238 will move switch arm 246 into engagement with contact 247 to energize electrically operable valve 38 and set up a high speed circuit to the three-speed control box 232. This circuit is as follows: line wire 422, manual switch 424, wire 427, wire 430, mercury switch 416, wire 431, wire 434, wire 463, switch arm 246, contact 247, wire 464, and wire 457, whereupon the circuit branches; one portion going by way of wire 458, three-speed control box 232, and wire 444 to ground 425, whereas the other portion goes by way of wire 459, electrically operable valve 38, wire 460 and wire 440 to ground 425. The compressor now operates at high speed and the large quantity of refrigerant thus produced flows to all three cooling coils 35, 36 and 37 to further reduce the temperature of the air passing thereover.

In this manner, during warm weather, the temperature and the relative humidity of the mixture of air being discharged from the rooms or spaces 10 and 11 control the flow of refrigerant to the three cooling coils 35, 36 and 37. If the temperature becomes too high, more and more cooling takes place without any possibility of reheating. Also, as the relative humidity increases, more and more cooling takes place but in the event such cooling causes a lowering of the temperature below the desired amount, then reheating takes place by passing the cooled air over a reheating coil which is heated by the hot gaseous refrigerant being delivered by the compressor 45. The two thermostats 117 and 118 which respectively respond to the temperatures of the rooms 10 and 11 control the dampers 85 and 110, in the manner set forth above, to divide the cooled air between these two rooms in such a manner as to maintain the two rooms at equal temperatures. It will be apparent that if one or both of these rooms is subjected to a relatively heavy load, then the temperature of the resulting mixture of air leaving both of these rooms will increase wherefore the thermostatic control 279 responsive to such mixed air temperature will cause a greater cooling effect to take place.

In addition, the outdoor compensating control 300 varies the operating point of the main control 279 which responds to the temperature of the mixture of discharged air. Now as the outdoor temperature goes up, the control point of this main control thermostat 279 will be raised wherefore less cooling will be supplied to the air conditioning device 12 for the same discharged air temperature. This means that only a certain amount of cooling can be obtained under such conditions and this cooling effect is split up between the two rooms 10 and 11 in accordance with the thermostats located therein so that these two rooms are maintained at equal temperatures.

If the outdoor temperature should now fall to say 70° F., the thermostat 410 will cause mercury switch 416 to open. Opening of this mercury switch breaks the circuit to all of the valves 38, 39 and 40 and also interrupts all of the circuits to the three-speed control box 232. It will therefore be impossible to open any of these valves or to operate the compressor 46 regardless of the positions which the motor mechanisms 217 and 218 may take. Opening of this mercury switch 416 likewise deenergizes relay coil 179 wherefore the two motor mechanisms 116 and 91 will assume mid-positions and remain therein regardless of temperature fluctuations in the two rooms or spaces 10 and 11. The dampers 85 and 110 therefore remain in half open position irrespective of the temperature in these rooms. The apparatus is now operating on or is ready to operate on a heating cycle and the temperature of the discharged air in the duct 215 will undoubtedly fall below 75° F. The thermostat 279 will therefore cause the motor mechanism 218 to run to its extreme position in which control arm 335 engages the upper end of control resistance 336 wherefore damper 52 will be moved to full open position and damper 51 will be fully closed. This causes all of the air leaving the air conditioning device 12 to pass through the reheating chamber 43 and over the reheating coil 44. However, since the compressor motor 46 cannot be deenergized by reason of the opening of mercury switch 416, the position of dampers 51 and 52 is immaterial in the operation of the system under this heating cycle. Also, although the relative humidity of the discharged air may fluctuate so as to variably position the motor mechanism 217 and operate its switches, as mentioned above, all of the circuits for the valves and the compressor motor are interrupted by opening of mercury switch 416.

The fresh air at approximately 70° F. will therefore pass through the air conditioning device 12 and be delivered in equal portions to the rooms or spaces 10 and 11. If this air temperature should be too low so that the temperature of either of these rooms becomes too low, its thermostat will operate its associated motor mechanism 71 or 98 to position the corresponding valves 66 or 93 whereby to supply heating fluid to the associated auxiliary heating coils 65 or 92.

If the temperature of the outside air falls below 50° F., then the valve 363 will be opened by the circuit set forth above, and a medium quantity of heating fluid will flow to the preheating coil 21. The thermostat 395 now becomes operative to position the inlet mixing dampers 22 and 23 in accordance with the temperature of the air being supplied to the delivery duct 16 so as to cause a sufficient quantity of this fresh air to pass through the preheating chamber 19 and over the preheating coil 21 to maintain the temperature of the delivered air at approximately 60° F. The remaining heating of this air will then be accomplished by the individual or auxiliary heating coils 65 and 92 which are controlled by their respective rooms or space thermostats. If the outdoor temperature continues to fall, and falls below 30° F., then the valve 365 is opened so as to supply a full amount of heating fluid to the preheating coil 21 in order that the thermostat 395 will be able to maintain the proper delivered air temperature by manipulating the inlet mixing dampers 22 and 23.

It will now be apparent that I have provided a novel air conditioning system by means of which heating, cooling, and dehumidification is obtained and one which has particular utility for controlling the conditions in a plurality of rooms or spaces which it is desired to separately control. It will be evident that many changes can be made in the details of the arrangements specifically set forth herein and in various of the sub-combinations without departing from the spirit of the present invention, and I am therefore to be limited only by the scope of the claims appended hereto.

I claim as my invention:

1. An air conditioning system for a plurality of spaces, comprising, in combination, means to deliver air to all of said spaces, a mechanical refrigeration system including a heating coil and a cooling coil, means to pass said air over said cooling coil and then over said heating coil prior to delivery to said spaces, means responsive to the moisture of the air leaving all of said spaces in control of the effect of said cooling coil, means responsive to the temperature of the air leaving all of said spaces in control of the effect of said heating coil, means to determine the proportions of conditioned air delivered to each of said spaces, and means responsive to the temperature of each of said spaces conjointly controlling said air proportioning means to proportion the air to said spaces in a manner to maintain the temperature of all of said spaces substantially equal.

2. An air conditioning system for a plurality of spaces, comprising, in combination, means to deliver air to all of said spaces, a mechanical refrigeration system including a heating coil and a cooling coil, means to pass said air over said cooling coil and then over said heating coil prior to delivery to said spaces, means responsive to the moisture in a mixture of air from all of said spaces in control of said refrigerating system, damper means in control of the proportions of the air passing over and around said heating coil, means responsive to the temperature of a mixture of air from all of said spaces in control of said damper means, damper means in control of the flow of the conditioned air to each of the spaces, and means responsive to the temperature in each space in control of said last-named damper means.

3. An air conditioning system for a plurality of spaces, comprising, in combination, an air conditioning device, a plurality of cooling coils therein, valve means to selectively render said cooling coils operative, a mechanical refrigeration system including said cooling coils and a heating means for the air conditioning device which obtains its heat from said mechanical refrigeration system, means to pass air through the air conditioning device and to all of said spaces, means responsive to the moisture content of a mixture of air taken from all of said spaces to operate said valve means to progressively render said cooling coils operative as the moisture content increases, means responsive to a mixture of air taken from all of said spaces in control of said valve means and heating means to render the heating means operative upon a fall in such temperature and to progressively render said cooling coils operative upon a rise in such temperature, means to determine the proportions of air delivered from the air conditioning device to each of said spaces, and means responsive to the temperature of each space in control of said air proportioning means.

4. In an air conditioning system, in combination, means for supplying air to a plurality of spaces to be controlled, means for cooling the air supplied to said spaces, flow control means for determining the proportions of the air passed to said spaces, thermostatic means responsive to the temperature of the air in each space for controlling said flow control means, said thermostatic means being arranged to control said flow control means in a manner to maintain the temperatures in said spaces equalized while allowing the space temperature maintained to vary, and means actuated when said cooling means is out of operation for positioning said flow controlling means in a manner to cause the delivery of a predetermined substantial portion of air to each space regardless of the difference in temperature between said spaces.

5. In an air conditioning system, in combination, means for supplying air to a plurality of spaces to be controlled, flow varying means for varying the proportions of air supplied to said spaces, means for cooling the air supplied to said spaces, temperature responsive means in each of said spaces, means actuated when the cooling means is in operation for conditioning said temperature responsive means to vary the air delivery to said spaces in a manner to maintain equal temperatures in said spaces while allowing the temperature maintained to vary, means for heating the air supplied to said spaces, and means actuated when the heating means is in operation for controlling said flow varying means so as to cause delivery of predetermined supplies of air to said spaces irrespective of difference in temperature between said spaces.

6. In a heating and cooling system, in combination, means for distributing a stream of air to a plurality of spaces to be conditioned, damper means for determining the proportions of the air stream delivered to each of said spaces, cooling means for cooling said air stream, individual heating means for heating the air delivered to each of said spaces, temperature responsive means in each of said spaces for controlling said damper means, means actuated upon a demand for cooling of said spaces for placing said cooling means in operation and for conditioning said thermostatic means to control said damper means in a manner to maintain equal temperatures in said spaces while permitting variation in such temperatures, means actuated upon demand for heating in said spaces for positioning said damper means to deliver predetermined supplies of air to said spaces irrespective of temperature difference between said spaces, and individual thermostats in said zones for controlling respective individual heating means.

7. In a summer-winter air conditioning system, in combination, duct means for distributing a stream of air to a plurality of spaces to be conditioned, means for cooling the air stream, individual heating devices for heating the air flowing to each space, means for placing said individual heating means in operation under the control of individual space temperature responsive means when the system is operating on the winter cycle, means for placing said cooling means in operation when the system is operating on the summer cycle, damper means for each space for controlling the amount of air delivered thereto, thermostatic means responsive to the temperature of each space, means for placing said thermostatic means in control of said damper means when the system is operating on the summer cycle for thereby varying the positions of said damper means in accordance with changes in space temperature during the summer cycle, and means for causing each of said damper means to be run to a predetermined open position when the system is placed on the winter cycle for thereby maintaining a flow of air through said individual heating means to enable said heating means to heat said spaces.

8. In an air conditioning system for a plurality of spaces, the combination of a refrigerating circuit having an evaporator, and means for circulating air to be conditioned thereover and to said spaces, said circuit serving to absorb heat from air being conditioned through said evaporator and reject such heat; means responsive to relative humidity causing the operation of said circuit to establish a desired relative humidity; means responsive to reduction of temperature of conditioned air below a limiting temperature for causing the circuit to deliver rejected heat to the conditioned air; means responsive to outdoor temperature for varying said limiting temperature, means to determine the proportions of conditioned air delivered to each of said spaces; and means responsive to the temperature of each of said spaces conjointly controlling said air proportioning means to maintain a predetermined relation between the temperatures of said spaces.

9. In an air conditioning system for a plurality of spaces, the combination of a refrigerating circuit having an evaporator, and means for circulating air to be conditioned thereover and to said spaces, said circuit serving to absorb heat from air being conditioned through said evaporator and reject said heat; means responsive to temperature of air in the conditioned space; means responsive to humidity of air in the conditioned space; means controlled by the temperature and humidity responsive means for keeping said circuit in operation if temperature or humidity or both be above desired values; means controlled by the temperature responsive means to cause the circuit when operating to reject heat to the conditioned air if the temperature thereof falls below a limiting temperature lower than that at which the temperature responsive means causes operation of the circuit; means responsive to outdoor temperatures to vary said limiting temperature, means to determine the proportions of conditioned air delivered to each of said spaces; and means responsive to the temperature of each of said spaces conjointly controlling said air proportioning means to maintain a predetermined relation between the temperatures of said spaces.

10. In an air conditioning system for an enclosure having a plurality of zones, in combination, air conditioning apparatus, means for passing air through said conditioning apparatus to said zones, damper means for controlling the flow of conditioned air to said zones, electrically controlled motor means for positioning said damper means, thermostatic means in each of said zones, a control circuit for said motor means and including said thermostatic means whereby said dampers are positioned in accordance with the temperatures in said zones, said control circuit being operative upon the thermostatic means of one zone being subjected to a change in temperature in a predetermined direction to cause a reduction in the air delivered to the rest of said enclosure, a thermostatic control circuit for said conditioning apparatus, and means associated with said motor means for causing said damper means to assume a position in which air is admitted to all of said zones when said control circuit for said conditioning apparatus is not calling for operation of the conditioning apparatus.

11. In an air conditioning system for an enclosure having a plurality of zones, in combination, air conditioning apparatus, means including a duct leading to each zone for conveying air through said conditioning apparatus to said zones, a damper associated with each zone duct for regulating the flow of air to that zone, an electrically controlled damper motor associated with each of said dampers, thermostatic means in each of said zones, a control circuit for all of said damper motors and including all of said thermostatic means whereby said thermostatic means cooperate in the positioning of said damper motor, said control circuit being operative upon the thermostatic means of one zone being subjected to a change in temperature in a predetermined direction to cause a reduction in the air delivered to the rest of said enclosure, a thermostatic control circuit for said conditioning apparatus, and means associated with said motors for causing said dampers to assume positions in which air is admitted to all of said zones when said control circuit for said conditioning apparatus is not calling for operation of the conditioning apparatus.

12. In a system of the class described, in combination, a plurality of zones, means for passing a stream of conditioning fluid to said zones, adjustable distributing means for dividing said stream into individual streams for each zone, electrical motor means for adjusting said distributing means to thereby vary the distribution of conditioning medium to said zones, an electrically operated controller for said motor means and operative to selectively cause movement of said distributing means in either direction, a first condition responsive variable impedance responsive to the condition at one of said zones for controlling the energization of said controller and a second condition responsive variable impedance responsive to the condition at the other of said zones for cooperating with said first condition responsive impedance, said first and second condition responsive variable impedances acting reversely, and a follow-up variable impedance actuated by said motor means for cooperating with said first and second condition responsive variable impedances in controlling the energization of said controller and hence the position of said motor means.

JOHN E. HAINES.